United States Patent
Xie et al.

(10) Patent No.: US 10,356,118 B2
(45) Date of Patent: Jul. 16, 2019

(54) TEST METHOD AND SYSTEM FOR PLC SECURITY DEFENSE DEVICE

(71) Applicant: University of Science and Technology Beijing, Beijing (CN)

(72) Inventors: Lun Xie, Beijing (CN); Weize Li, Beijing (CN); Zhiliang Wang, Beijing (CN)

(*) Notice: Subject to any disclaimer, the term of this patent is extended or adjusted under 35 U.S.C. 154(b) by 261 days.

(21) Appl. No.: 15/252,223

(22) Filed: Aug. 31, 2016

(65) Prior Publication Data

US 2017/0013009 A1   Jan. 12, 2017

Related U.S. Application Data (63) Continuation of application No. PCT/CN2015/087504, filed on Aug. 19, 2015.

(30) Foreign Application Priority Data

Jul. 7, 2015   (CN) .......................... 2015 1 0395194

(51) Int. Cl.
*H04L 29/06* (2006.01)
*G06F 15/16* (2006.01)

(52) U.S. Cl.
CPC .............. *H04L 63/1433* (2013.01)

(58) Field of Classification Search
CPC .................................................. H04L 63/1433
See application file for complete search history.

(56) References Cited

U.S. PATENT DOCUMENTS

| 9,467,455 | B2* | 10/2016 | Seiver | H04L 63/101 |
| 2014/0137257 | A1* | 5/2014 | Martinez | H04L 63/1433 726/25 |
| 2014/0289852 | A1* | 9/2014 | Evans | G06F 21/55 726/23 |

\* cited by examiner

*Primary Examiner* — Kambiz Zand
*Assistant Examiner* — Arezoo Sherkat
(74) *Attorney, Agent, or Firm* — Erson IP (Nelson IP)

(57) ABSTRACT

A test method and system for PLC security defense device are provided. The method including: acquiring by the first test end the information about the device under test, involving the type of communication mode, the type of PLC, the attack type and/or attack rule; after the attack messages to the device under test being generated and sent to the device under test, obtaining by the first test end the assessment results of the PLC security defense device on the basis of the second test end's response message. This is a fast, objective and thorough assessment method to testify security defense function of the device under test.

4 Claims, 11 Drawing Sheets

TEST METHOD AND SYSTEM FOR PLC SECURITY DEFENSE DEVICE

CROSS-REFERENCE TO RELATED APPLICATIONS

This application is a continuation of International Patent Application No. PCT/CN2015/087504 with a filing date of Aug. 19, 2015, designating the United States, now pending, and further claims priority to Chinese Patent Application No. 201510395194.4 with a filing date of Jul. 7, 2015. The content of the aforementioned applications, including any intervening amendments thereto, are incorporated herein by reference.

TECHNICAL FIELD

This invention relates to the field of information security technology of industrial control systems, especially to a test method and system for PLC security defense device.

BACKGROUND OF THE PRESENT INVENTION

In 2010, Stuxnet, a computer malicious worm, hacked into the control system of Iran's Bushehr nuclear power plant via an infected USB flash drive. Exploiting "zero-day" vulnerability, it infected with the project files of Siemens control software. Through modifying the user program in the PLC (Programmable Logic Controller) connected to the infected host, it dramatically changed the controlled centrifuge spinning, which led to damage to the machine and improper running of the nuclear facilities. PLC, as a core control unit of industrial control systems, of its security, directly determines the normal and stable operation of industrial control systems. After Stuxnet, PLC's security becomes a focus of the industry.

The existing test methods for PLC security defense device only test on corresponding defense rules of the PLC security defense device, with simpler test means that cannot comprehensively test on the security features of the device.

SUMMARY OF PRESENT INVENTION

The technical problem to be solved by this invention is to provide a test method and system for the PLC security defense device, so as to provide a fast, objective and comprehensive assessment on the security features of the device.

To solve the aforesaid problem, this invention embodiment provides a test method for the device, including:

acquiring, by the first test end, at least one type of communication mode for the device under test, and identifying at least one type of PLC corresponding to each type of communication mode;

determining attack type and/or attack rule corresponding to each type of PLC;

generating, in the order of the type of communication mode and its corresponding PLC type, attack messages corresponding to each of the attack type and/or attack rule, and sending the attack messages to the device under test in sequence;

acquiring, by the second end, messages generated by the device under test upon receiving the attack messages, generating response messages according to the acquired messages, and sending the response message to the first test end;

deriving, by the first test end, the test result of the PLC security defense device according to all of the response messages upon receiving all of the response messages.

Preferably, deriving, by the first test end, the test result of the PLC security defense device according to all of the response messages upon receiving all of the response messages, including:

upon receiving all of the response messages, counting, by the first test end the total number of the attacks, the number of the interceptions and/or the number of the alerts;

Get the test result of the PLC security defense device at the ratio of the number of the interceptions and/or the number of the alerts to the total number of the attacks.

Preferably, generating, in the order of the type of communication mode and its corresponding PLC type, attack messages corresponding to each of the attack type and/or attack rule, including:

acquiring the communication message formats and host link commands corresponding to each type of PLC;

Combining each of the attack type and/or attack rule with the communication message formats and host link commands corresponding to each type of PLC, to generate attack messages for the device under test.

Preferably, before determining attack type and/or attack rule corresponding to each type of PLC, the method further includes:

sending by the first test end initialization info to the second test end, wherein the initialization info includes the communication mode, the PLC type and the initialization command;

receiving by the second test end the initialization information to extract correspondingly the communication mode and the type of PLC.

Preferably, the first test end sends initialization info to the second test end, including:

When there are changes on the communication mode and/or the PLC type, the first test end is to send initialization info to the second test end.

This invention also provides a test system for the device, wherein the system includes: the first test end and the second test end. The first test end includes:

Type determination module: configured to acquire at least one type of communication mode for testing the device under test, and identify at least one type of PLC corresponding to each type of the communication mode;

Attack type determination module: configured to determine the attack type and/or the attack rule corresponding to each type of PLC;

Attack message generation module: configured to generate in the order of the type of communication mode and its corresponding PLC type, attack messages, corresponding to each of the attack type and/or attack rule, and send the attack messages to the device under test in sequence;

Test result generation module: configured to derive the test result for the PLC security defense device according to all of the response messages acquired by the first test end;

The second test end includes:

Response message generation module: configured to acquire messages generated by the device under test upon receiving the attack messages, generate response messages according to the acquired messages, and send the response message to the first test end.

Preferably, the test result generation module includes:

Statistics unit: configured to count the total number of the attacks, the number of the interceptions and/or the number of the alerts upon receiving by the first test end all of the response messages;

Result output unit: configured to get the test result of the PLC security defense device at the ratio of the number of the interceptions and/or the number of the alerts to the total number of the attacks.

Preferably, the attack message generation module includes:

Link command acquisition unit: configured to acquire the communication message formats and host link commands corresponding to each of the PLC type;

Attack message generation unit: configured to combine each of the attack type and/or attack rule with the communication message formats and host link commands corresponding to each PLC type, to generate attack messages for the device under test.

Preferably, the system also includes:

The first initialization module: send by the first test end initialization info to the second test end, wherein the initialization info includes the communication mode, the PLC type and the initialization command;

The second initialization module: receive by the second test end the initialization info to extract corresponding communication mode and PLC type there from.

Preferably, the first initialization module includes:

The first initialization unit: send by the first test end the initialization info to the second testing end when there are changes on the communication mode and/or the PLC type.

The aforesaid technical solution of this invention has the following advantageous effects:

In the aforesaid solution, by generating attack messages corresponding to each of the attack type and/or attack rule in the order of the communication mode and its corresponding PLC type, and sending the attack messages to the device under test in sequence, the device under test's security guard function which is based on deep message parsing of industrial control network protocol can be tested and validated fast, objectively and comprehensively, and the ability of defending the attack of the PLC message can is evaluated.

DETAILED DESCRIPTION OF PREFERRED EMBODIMENTS

To clarify the technical problem to be solved, technical solution and advantages by and of this invention, a detailed description will be made in combination with the attached figures and embodiment as follows.

Figure 1:
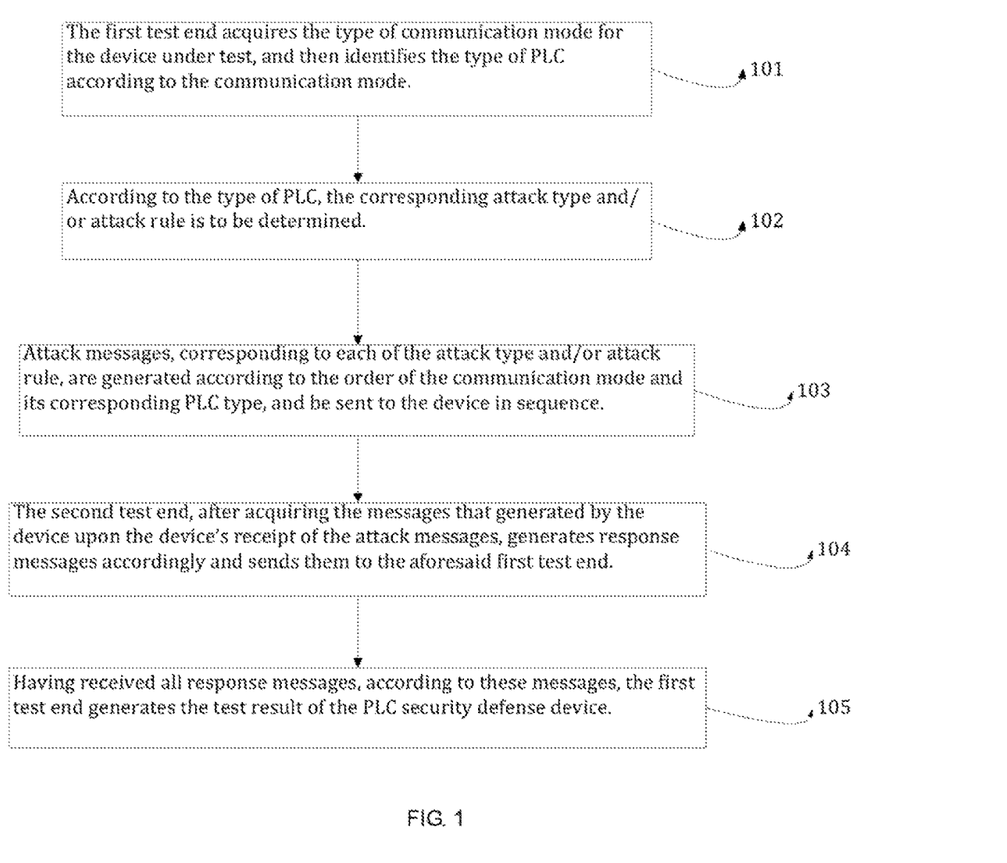
FIG. 1 is a flowchart of the test method for the PLC security defense device of present invention.

As shown in FIG. 1, a test method for the device according to embodiments of the present invention is provided. The method includes:

Step 101: The first test end acquires at least one type of communication mode for testing the device under test, and identify at least one type of PLC corresponding to each type of communication mode according to the communication mode.

Wherein, the first test end can acquire the communication mode of the device under test, from the communication mode library, in which stores all types of communication modes that supported by this system; the first test end can identify the PLC type corresponding to each of the communication modes via the PLC type library, in which stores all PLC types that supported by this system. The types of communication modes supported by this system may include: Modbus/TCP, Modbus RTU, DNP3, CAN, Fins and Fetch/Write, etc.; the PLC types that are supported may include: CPM1A Series, C200H Series, CQM1H Series and some other Omron series, S7-200 Series, S7-300 Series, S7-400 Series and some other Siemens series. The supported PLC types can be extended via the PLC type library of the system.

In this embodiment, by acquiring the type of the communication mode and its corresponding PLC type of the device, the comprehensiveness of the testis improved; and by further acquiring the communication mode of the device from the communication mode library and identifying the PLC type corresponding to each of the communication modes via the PLC type library, the efficiency and accuracy of the testis improved.

Step 102: According to the type of PLC, the corresponding attack type and/or attack rule is determined.

Wherein, it is determined whether there are detection rules for the device. If there are detection rules, the rule extension library will generate corresponding attack rule, with a traverse of the attack types in the library of the attack rules and attack types. If there is no detection rule, it will traverse the attack types in the attack type library. The rule extension library stores all of the detection rules supported by this system, and the attack type library stores all of the attack types supported by this system.

In this embodiment, the attack type and/or attack rule corresponding to each of the PLC types can be determined quickly and accurately, so as to improve the completeness of the test.

Step 103: Attack messages, corresponding to each of the attack type and/or attack rule, are generated in the order of the communication mode and its corresponding PLC type, and be sent to the device in sequence.

Wherein, the communication message formats and host link commands corresponding to each of the PLC types can be acquired; and each of the attack type and/or attack rule can be combined with the communication message formats and host link commands corresponding to each PLC type, to generate attack messages to the device under test.

The communication message formats corresponding to each of the PLC types can be acquired from the message format library, and the host link commands corresponding to each of the PLC types can be acquired from the link command library, and the attack messages to the device under test can be generated via the attack type library.

Step 104: The second test end, after acquiring the messages that generated by the device upon the device's receipt of the attack messages, generates response messages accordingly and sends the response messages to the aforesaid first test end.

Wherein, response messages can be generated via the response command library.

In this embodiment, the communication mode library, message format library, link command library and attack type library are all extendable, which makes this invention to better meet the testing needs of more PLC security defense products.

Step 105: upon receiving all of the response messages, the first test end generates the test result of the PLC security defense device according to all of the response messages.

Wherein, having received all response messages, the first test end counts the total number of the attacks, the number of the interceptions and/or the number of the alerts according to all of the response messages; and gets the test result for the PLC security defense device at the ratio of the number of the interceptions and/or the alerts to the total number of the attacks The test method for the PLC security defense device in the embodiments of the present invention, by generating attack messages corresponding to each of the attack type and/or attack rule in the order of the communication mode and its corresponding PLC type, and sending the attack messages to the device under test in sequence, the device under test's security guard function which is based on deep message parsing of industrial control network protocol can be tested and validated fast, objectively and comprehensively, and the ability of defending the attack of the PLC message can is evaluated.

Figure 2:
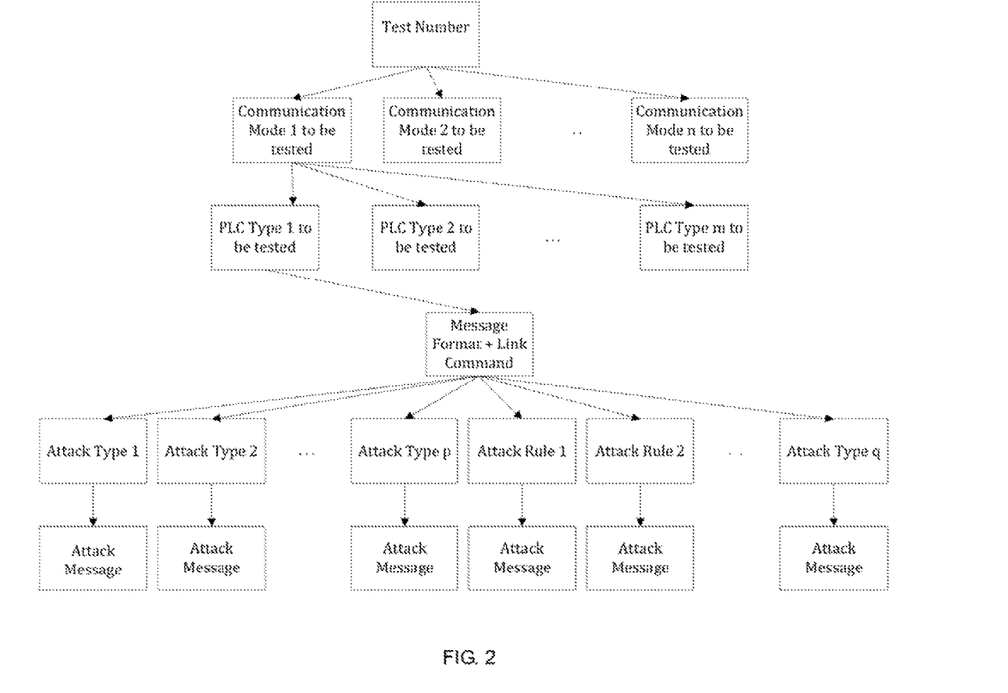
FIG. 2 is a schematic diagram of the mode of the test method for the PLC security defense device according to an embodiment of the present invention.

As shown in FIG. 2, the test method for the PLC security defense device is illustrated. A complete testing process includes n groups of tests on communication mode under test; each group of tests on communication mode under test includes m groups of tests on PLC type under test; each group of tests on PLC type under test includes p groups of tests on attack type and q groups of tests on attack rule. For the same group of tests on PLC type, all attack messages are generated on the basis of the communication formats and the host link commands corresponding to the PLC type.

For an accomplished testing process, the final number of attack tests is $(p+q)*m*n$. If the number of interception for the attack messages is f, and the number of the alerts is g, the test score is $(f+g)/[(p+q)*m*n]$.

Figure 3:
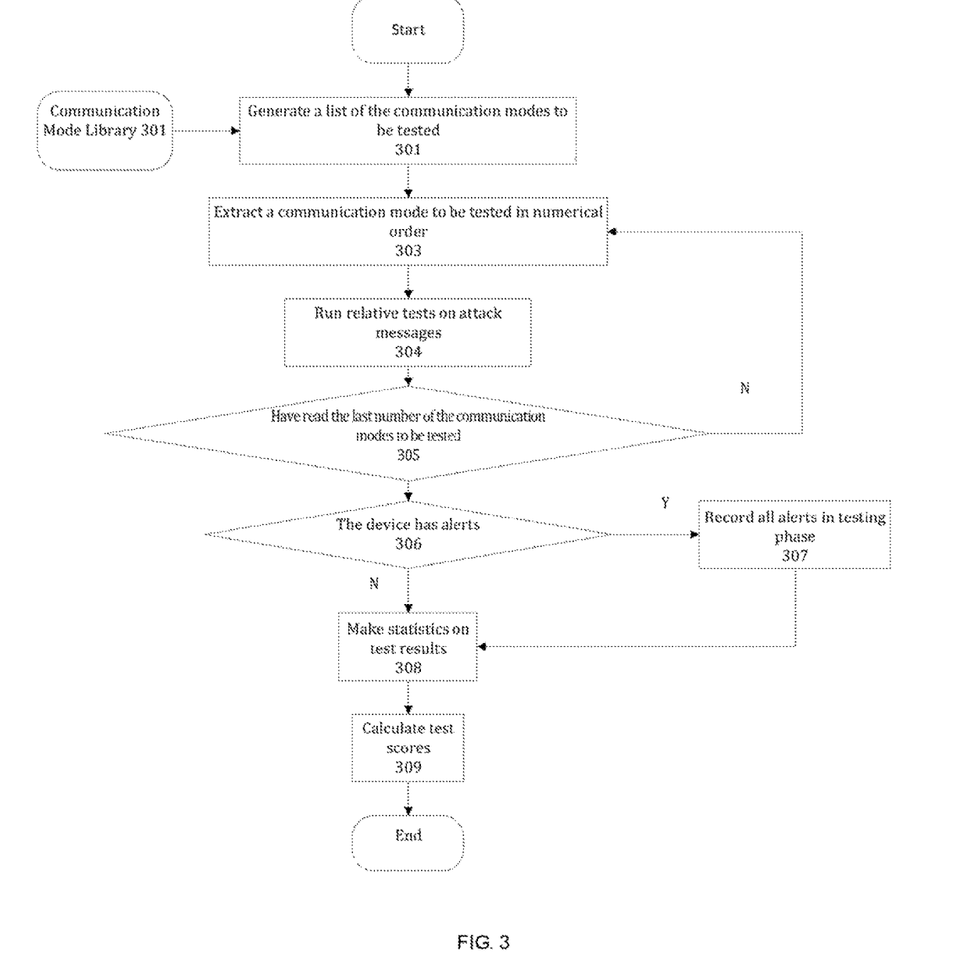
FIG. 3 is a logic flow diagram of the test method for the PLC security defense device according to an embodiment of the present invention.

As shown in FIG. 3, the test method for the PLC security defense device according to the embodiments of the present invention is illustrated. Step 302 is to extract all of the communication modes to be tested from Communication Mode Library 301 and generate a list of communication modes under test, according to the test requirements of the device. Step 303 is to select the first communication mode to be tested in sequence of the serial number of the communication modes. Step 304 is to run the tests on the corresponding attack messages (see the details in FIG. 4). Step 305 is to judge whether the current tested communication mode is the last communication mode to be tested. If it is not the last one, repeat Step 303, Step 304 and Step 305. If it is the last one, proceed to Step 306. In Step 306, if the device has the function of detection and alert, the process proceeds to Step 307. The test system will record the number of all alerts to the device under test during the testing phase. The function of detection and alert refers to generate the alert by the device under test upon detecting attack messages, without interception of attack messages. Step 308 makes statistics on the test results. Step 39 calculates the test scores.

Figure 4:
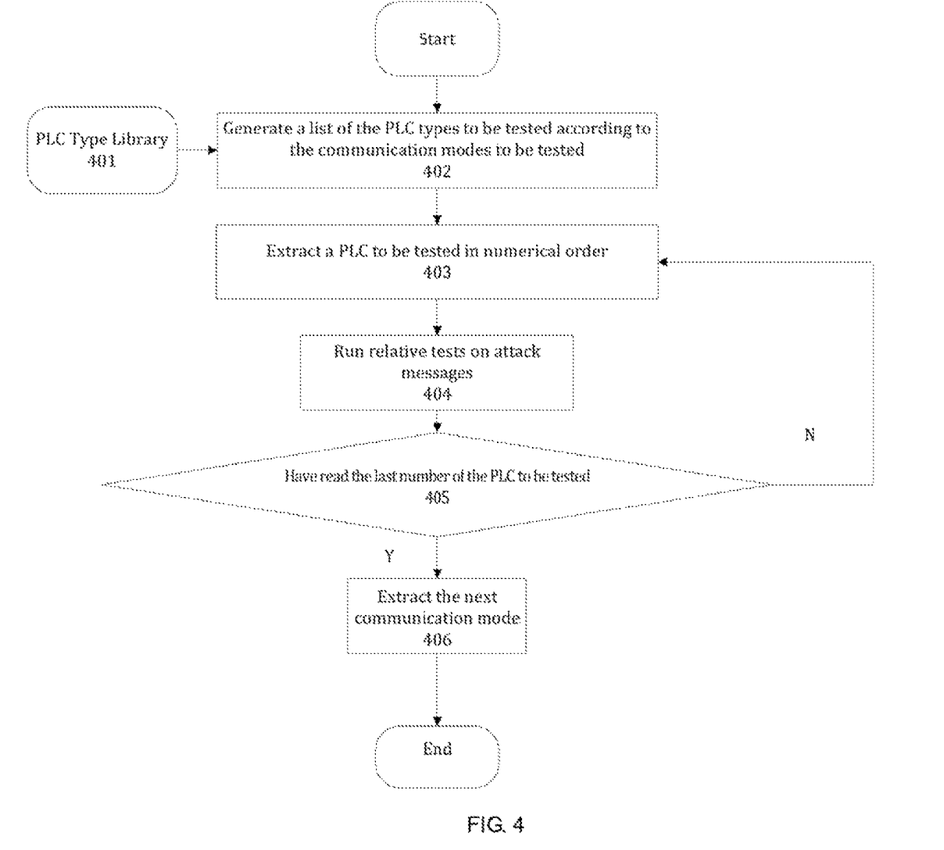
FIG. 4 is a logic flow diagram of the test method for the PLC security defense device according to an embodiment of the present invention.

As shown in FIG. 4, the test method for the PLC security defense device according to the embodiments of the present invention is illustrated. Step 402 is to extract the PLC type to be tested from the PLC Type Library 401 and generate a list of PLCs to be tested, according to the communication mode to be tested. Step 403 is to select the first PLC type to be tested in sequence of the serial number of the PLC types. Step 404 is to run the tests on the corresponding attack messages (see the details in FIG. 5). Step 405 is to judge whether the current tested PLC type is the last PLC type to be tested. If it is not the last, repeat Step 403, Step 404 and Step 405. If it is the last one, proceed to Step 406 to extract the next PLC type to be tested.

Figure 5:
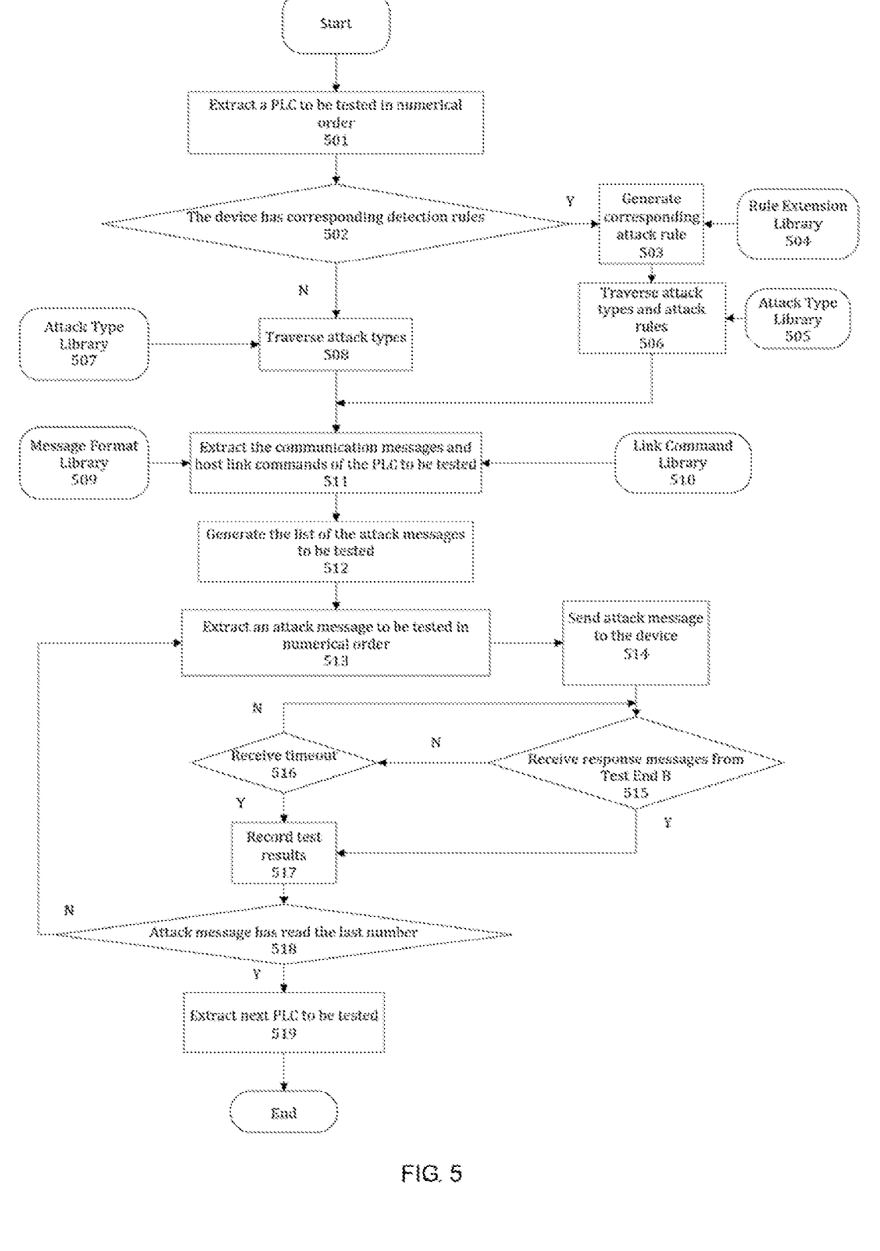
FIG. 5 is a logic flow diagram of the test method for the PLC security defense device according to an embodiment of the present invention.

As shown in FIG. 5, the test method for the PLC security defense device according to the embodiments of the present invention is illustrated. Step 501 is to extract a PLC type to be tested in numerical order. Step 502 is to judge whether there are detection rules for the device under test. If there are detection rules, it will proceed to Step 503, and generate corresponding attack rule according to Rule Extension Library 504. Then the process proceeds to Step 506 with a traverse of attack Rules and the attack types in Attack Types Library 505. If there is no detection rule for the device under test in Step 502, it will proceed to Step 508 with a traverse of the attack types in Attack Type Library 507. Numerals 505 and 507 as shown in the Figure are the same attack type library. Step 511 is to select the corresponding communication mode formats and host link commands from Message Format Library 509 and Link Command Library 510 respectively, and to generate a list of the attack messages to the device under test after step 512. Step 513 is to read the first attack message in the list by number. Step 514 is to send the attack messages to the device under test. Step 515 is to judge whether response messages are received. If response messages are not received, it will proceed to Step 516 to judge whether there is a timeout to receive response messages. If there is no timeout, repeat Step 515; if there is timeout, proceed to Step 517. If it receives response messages in Step 515, it will proceed directly to Step 517. Step 517 is to record the results of this test on attack messages. Step 518 is to judge whether the attack message sent this time is the last one in the message list. If it is not the last one, repeat Step 513 to Step 518. If it is the last one, proceed to Step 519 to extract the next PLC to be tested.

Before Step 103, the test method for the PLC security defense device according to an embodiment of the present invention further includes the following steps.

The first test end sends initialization info to the second test end, wherein the initialization info includes the communication mode, the PLC type and the initialization command;

The second test end extracts correspondingly the communication mode and the PLC type from the initialization information received.

Preferably, the first test end sending initialization info to the second test end includes:

When there are changes on the communication mode and/or the PLC type, the first test end sending initialization info to the second test end.

Figure 6:
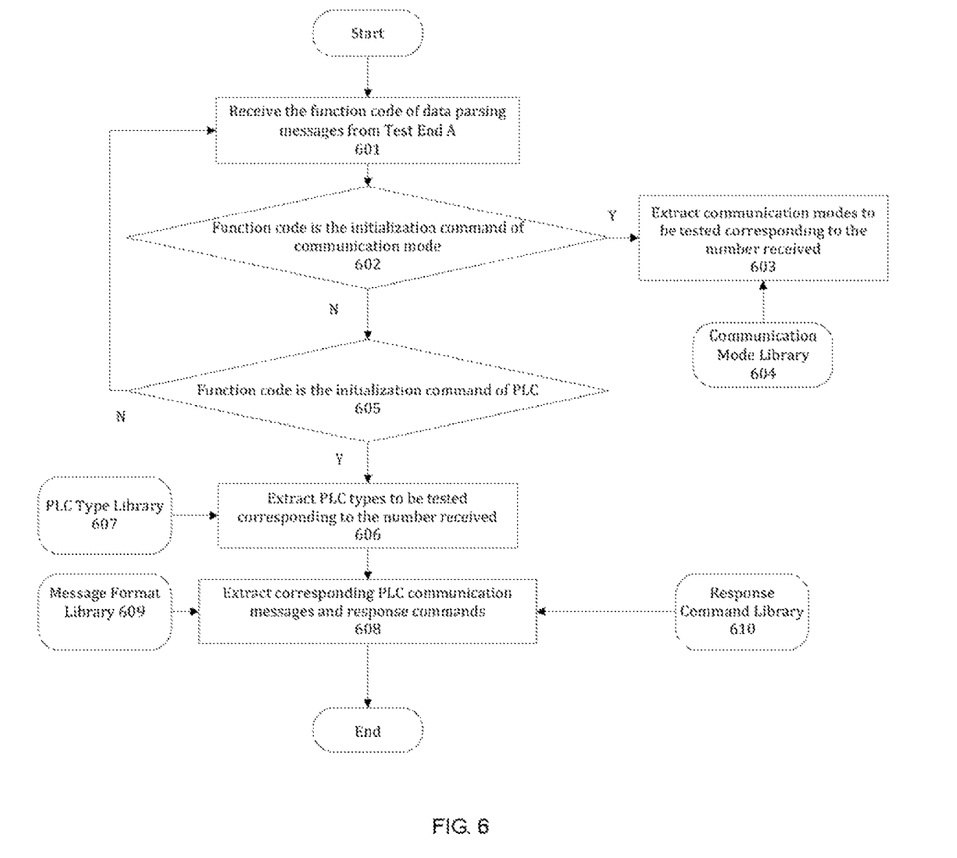
FIG. 6 is an initialization logic flow diagram of Test End B in the test method for the PLC security defense device of this invention embodiment.

Specifically, as shown in FIG. 6, Step 601 is to receive the data from Test End A, parse the messages and extract the function codes in it. Step 602 is to judge whether the function code is an initialization command of communication modes. If yes, Step 603 is to extract communication modes to be tested from Communication Mode Library 604, according to the data extracted from the messages, i.e. the serial number of the communication modes to be tested. If the function code in Step 602 is not an initialization command of the communication modes, it will proceed to Step 605 to judge whether it is an initialization command of PLCs. If not, go back to Step 601; if yes, proceed to Step 606. In Step 606, Test End B will extract the corresponding PLC types from the PLC type library, according to the data extracted from the messages, i.e. the serial number of the PLC types to be tested. Step 608 is to extract the corresponding communication message formats from Message Format Library 609 and the response commands corresponding to the PLC host link commands from Response Command 610, according to the communication modes to be tested and the PLC types to be tested, to complete initialization. Step 611 thereafter is to inform Test End A of the readiness.

Figure 7:
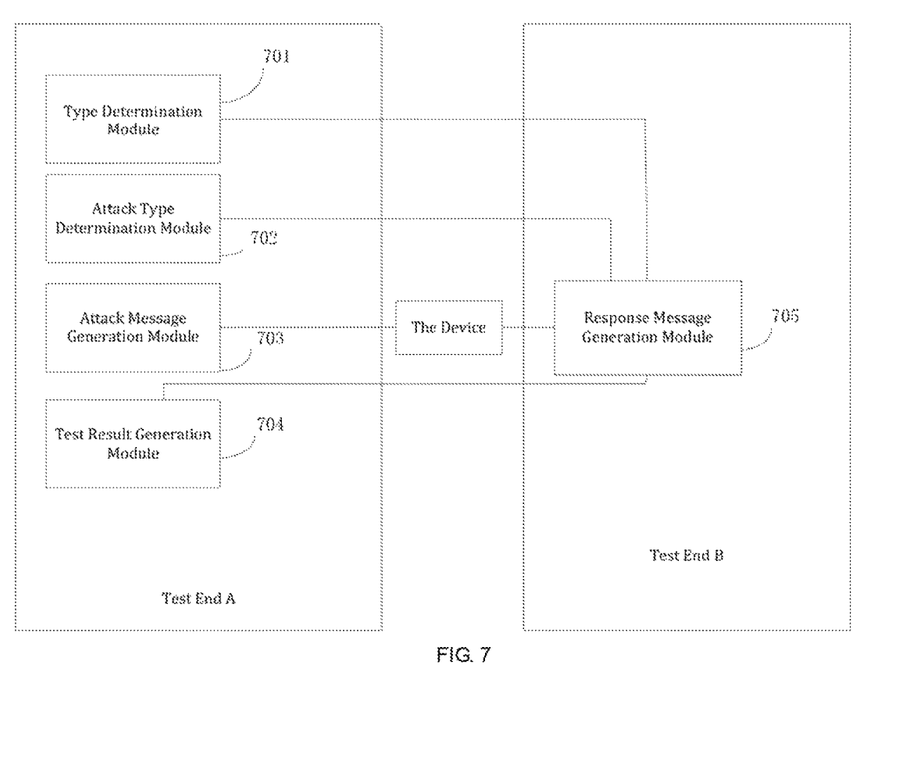
FIG. 7 is a structural connection diagram of the test system for the PLC security defense device according to an embodiment of the present invention.

As shown in the FIG. 7, a test system for the PLC security defense device according to an embodiment of the present invention is provide. The system includes: the First Test End A and the Second Test End B. The First Test End A includes:

Type Determination Module 701: configured to acquire at least one communication mode by which the device is tested, and identify at least one PLC type corresponding to each of the communication mode;

Attack Type Determination Module 702: configured to determine the attack type and/or the attack rule corresponding to each of the PLC type;

Attack Message Generation Module 703: configured to generate attack messages, corresponding to each of the attack type and/or attack rule, in the order of the communication mode and its corresponding PLC type, and send the attack messages to the device under test in sequence;

Test Result Generation Module 704: configured to derive the test result for the PLC security defense device according to all of the response messages acquired by the first test end;

The Second Test End B includes:

Response Message Generation Module 705: configured to acquire the messages that generated by the device under test upon receipt of the attack messages, and generate response messages accordingly and send the response messages to the aforesaid first test end.

Preferably, the test result generation module includes:

Statistics unit: configured to count the total number of the attacks, the number of interceptions and/or the number of alerts after the first test end having acquired all of the response messages;

Result output unit: configured to get the test result for the PLC security defense device at the ratio of the number of the interceptions and/or the alerts to the total number of the attacks.

Preferably, the attack message generation module includes:

Link command acquisition unit: configured to acquire the communication message formats and host link commands corresponding to each of the PLC type;

Attack message generation unit: configured to combine each of the attack type and/or attack rule with the communication message formats and host link commands corresponding to each PLC type, to generate attack messages to the device under test.

Preferably, the system further includes:

The first initialization module: configured to send by the first test end initialization info to the second test end, wherein the initialization info includes the communication mode, the PLC type and the initialization command;

The second initialization module: configured to acquire by the second test end initialization info and extract corresponding communication mode and PLC type there from.

Preferably, the first initialization module includes:

The first initialization unit: send initialization info to the second testing end when there are changes on the communication mode and/or the PLC type.

Figure 8:
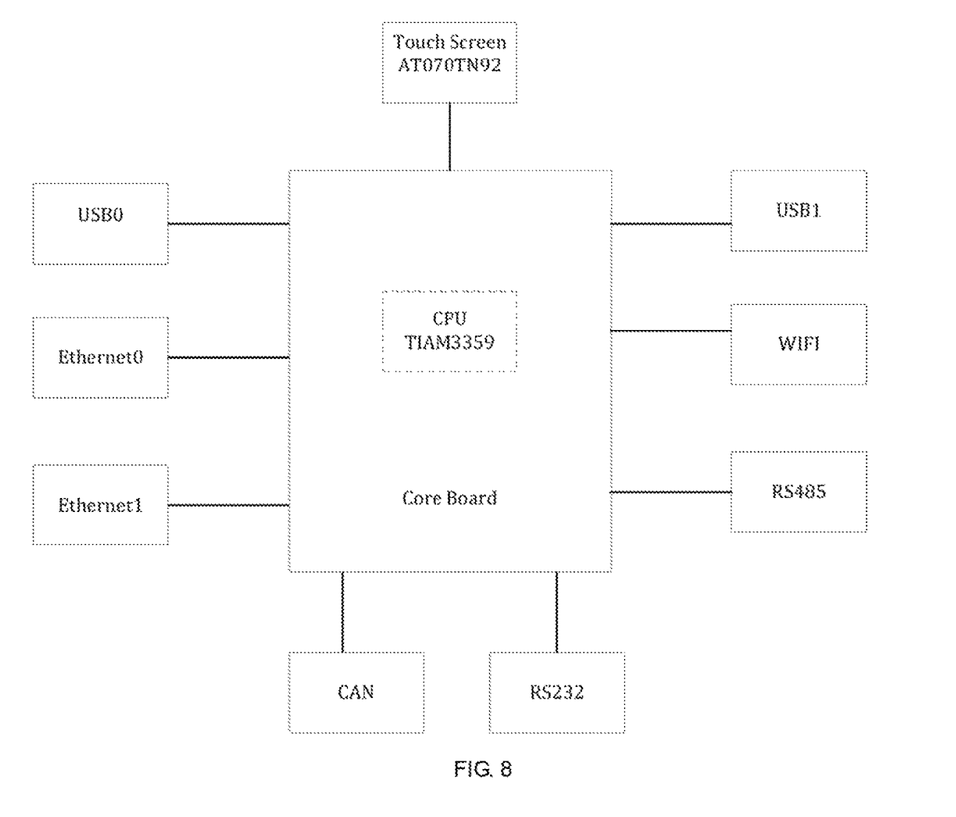
FIG. 8 is a hardware interface connection diagram of the test system for the PLC security defense device according to embodiments of the present invention.

Specifically, as shown in FIG. 8, the test system for PLC security defense device according to an embodiment of the present invention is provided. The hardware structures of the two test ends may be the same, both of which are composed of core board and expansion board base on TI AM3359 Cortex-A8 processor. The communication interfaces of the expansion board include: 2-way Gigabit Ethernet interface, 2-way USB interface, 1-way RS485 interface, 1-way RS232 interface, 1-way CAN bus interface and 1-way WIFI interface. Among them, Ethernet0 interface runs the communication between Test End A and Test End B; 2-way USB interface supports USB2.0 protocol; USB0 is a USB OTG interface; USB1 is a USBHOST interface; 1-way RS485 shares with Profibus. In addition, Test End A and Test End B are both equipped with Touchscreen Model AT070TN92. The communication modes supported by this device include but are not limited to: Modbus/TCP, Modbus RTU, DNP3, CAN, Fins and Fetch/Write, etc. The supported protocol types can by expanded by using the communication mode library of the system. The PLCs supported by this device include but are not limited to: CPM1A series, C200H series and CQM1H series and some other Omron series; S7-200 series, S7-300 series and S7-400 series and some other Siemens series. The supported PLC types can be expanded by using the PLC type library of the system.

Figure 9:
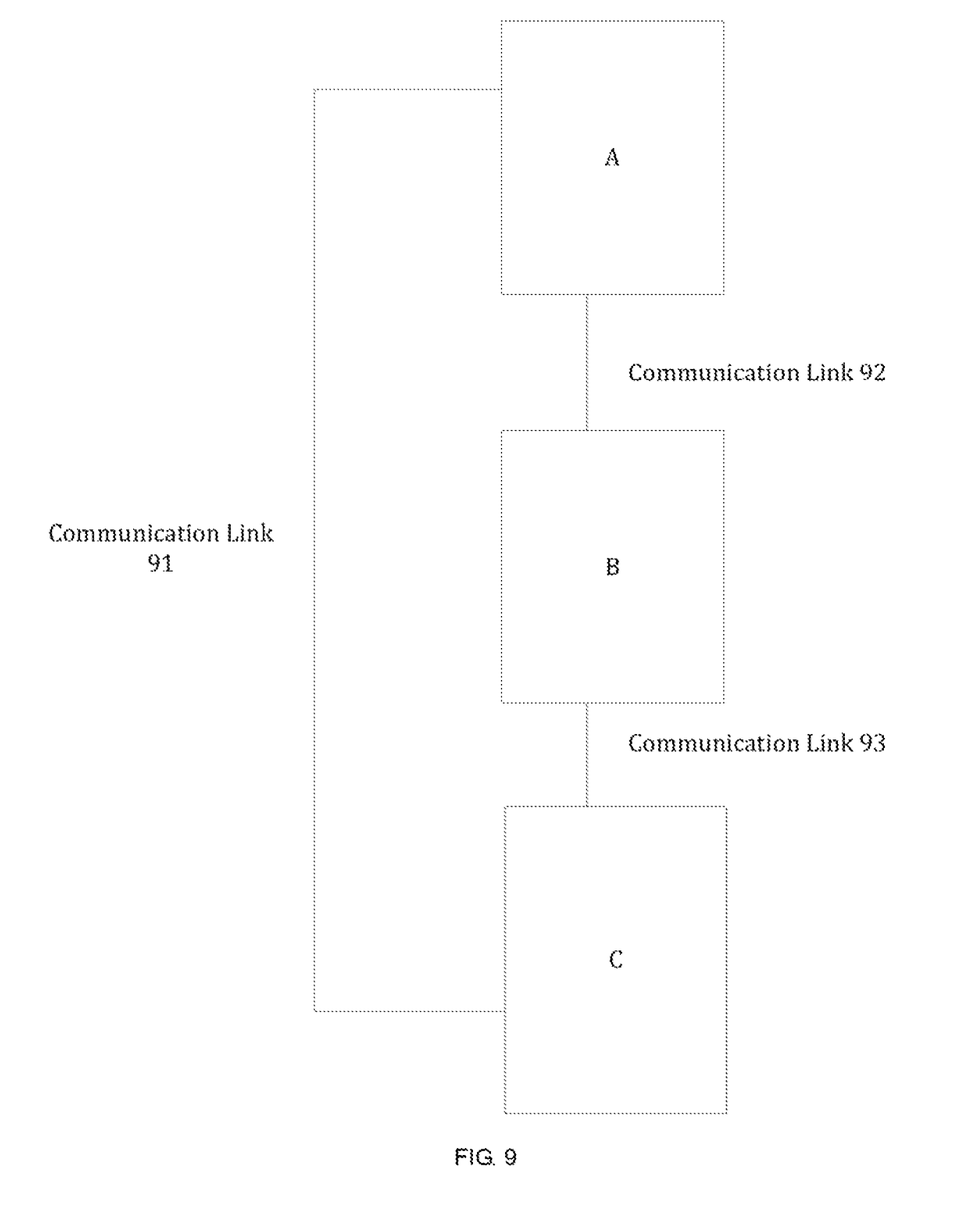
FIG. 9 is a connection diagram of the structure of the test system for the PLC security defense device according to an embodiment of the present invention.

FIG. 9 shows the test system for the PLC security defense device according to an embodiment of the present invention. Among it, Communication Link 901, Communication Link 902 and Communication Link 903 are all bidirectional communication links. Test End A and Test End B are connected by Communication Link 901, whose communication interface is Ethernet0 as shown in FIG. 8. Test End A and Device C under test are connected by Communication Link 902. Test End B and Device C under test are connected by Communication Link 903. The communication interfaces to Link 902 and Link 903 can be selected among Ethernet1, WIFI, RS232, RS485 and CAN interface as shown in FIG. 8 according to test requirements. When data communication is conducted through Communication Link 901 between Test End A and Test End B, a coding and decoding manner of ASCII is utilized, in which communication message formats are shown as follows:

| Start Tag | Function Code | Data | End Tag |
| --- | --- | --- | --- |
| 1 Byte | 2 Byte | 2 Byte | 1 Byte |

Start tag: 1 byte, at the beginning of each message;
Function Code: 2 byte, for setting command codes;
Data: 2 byte, for transporting corresponding parameters of the commands;

End tag: 1 byte, arranged at the end of each message indicating the end of the message.

Figure 10:
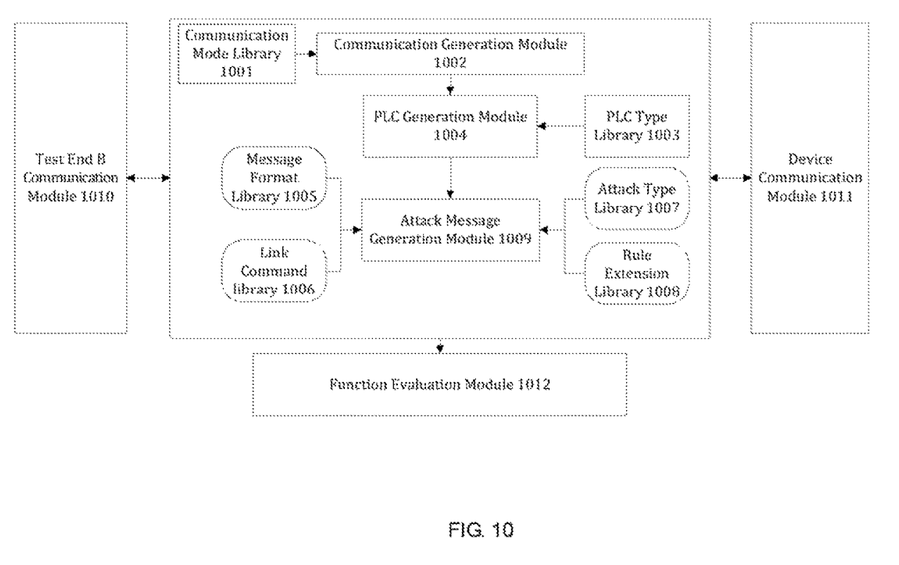
FIG. 10 is a schematic diagram of Test End A in the test system for the PLC security defense device according to an embodiment of the present invention.

FIG. 10 shows the structural schematic diagram of Test End A in the test system for the PLC security defense device according to an embodiment of the present invention, including: Communication Mode Library 1001 that stores all communication modes supported by this system; Communication Generation Module 1002 that extracts communication modes to be tested from the communication mode library; PLC Type Library 1003 that stores all PLC types supported by this system; PLC Generation Module 1004 that extract corresponding PLC types to be tested from the PLC type library; Message Format Library 1005 that stores all PLC communication message formats supported by this system; Link Command Library 1006 that stores all PLC host link commands supported by this system; Attack Type Library 1007 that stores all attack types against communication messages supported by this system; Rule Extension Library 1008 that stores the attack rules against the detection rules of the device under test; Attack Message Generation Module 1009 that generates corresponding attack messages; Test End B Communication Module 1010 that directly communicates with Test End B; Device Communication Module 1011 that sends attack messages to the device under test and collects response messages; Function Evaluation Module 1012 that comprehensively analyzes all attack test results and generates corresponding function evaluation.

Figure 11:
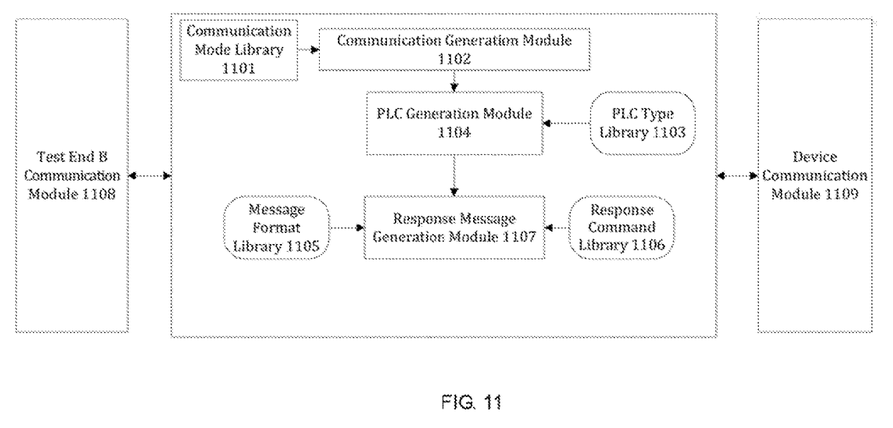
FIG. 11 is a schematic diagram of Test End B in the test system for the PLC security defense device according to an embodiment of the present invention.

FIG. 11 shows the structural schematic diagram of Test End B in the test system for the PLC security defense device according to an embodiment of the present invention, including: Communication Mode Library 1101 that stores all communication modes supported by this system; Communication Generation Module 1102 that extracts communication modes to be tested from the communication mode library; PLC Type Library 1103 that stores all PLC types supported by this system; PLC Generation Module 1104 that extract corresponding PLC types to be tested from the PLC type library; Message Format Library 1105 that stores all PLC communication message formats supported by this system; Response Command Library 1106 that stores all response commands of the PLC host link commands supported by this system; Response Message Generation Module 1107 that extracts corresponding communication message formats from the message format library and extracts response commands corresponding to the PLC host link commands from the response command library, as well as generates corresponding response messages according to the attack messages from Test End A; Test End A Communication Module 1108 that directly communicates with Test End A; Device Communication Module 1109 that collects attack messages and returns test response messages.

The test system for the PLC security defense device according to embodiments of the present invention employs the test method for the PLC security defense device. Thus, the test system for the PLC security defense device shares the same feature with the test method for the PLC security defense device, so that we will not repeat it here.

The above is a preferred embodiment of the present invention. It should be noted that those having ordinary skills in this technical field can also make a number of improvements and modifications without departing from the principles of the present invention, where the improvements and modifications are also to be considered within the scope of the present invention.

We claim:

1. A test method for a programmable logic controller (PLC) security defense device, comprising:

acquiring, by a first test end, at least one type of communication mode for testing the PLC security defense device, and identifying at least one type of PLC corresponding to each type of communication mode;

sending by the first test end initialization information to a second test end, wherein the initialization information includes a communication mode, a type of PLC and an initialization command;

receiving the initialization information by the second test end;

extracting correspondingly, from the initialization information, the communication mode and the type of PLC;

determining attack type and/or attack rule corresponding to each type of PLC;

generating, in an order of the type of communication mode and its corresponding PLC type, attack messages corresponding to each of the attack type and/or the attack rule, and sending the attack messages to the PLC security defense device under test in sequence of PLC security defense devices, which includes: acquiring communication message formats and host link commands corresponding to each type of PLC;

combining each of the attack type and/or the attack rule with the communication message formats and the host link commands corresponding to each type of PLC to generate the attack messages for the PLC security defense device under test;

sending the attack messages to the PLC device under test;

acquiring, by the second test end, messages generated by the PLC security defense device under test upon receiving the attack messages, generating response messages according to the acquired messages, and sending the response messages to the first test end;

deriving, by the first test end, a test result of the PLC security defense device according to all of the response messages upon receiving the all of the response messages, wherein the deriving comprises:

counting, by the first test end a total number of attacks, number of interceptions and/or number of alerts, and obtaining a ratio of the number of the interceptions and/or the number of the alerts to the total number of the attacks as the test result for the PLC security defense device under test;

wherein, both of the first test end and the second test end are composed of core board and expansion board base on processor; the first test end and the second test end, the first test end and the PLC security defense device, and also the second test end and the PLC security defense device are connected by a communication link respectively.

2. The test method according to claim 1, wherein sending by the first test end the initialization information to the second test end, includes:

sending by the first test end the initialization information to the second test end when there are changes in the communication mode and/or the type of PLC.

3. A test system for a Programmable Logic Controller (PLC) security defense device, which includes: a first test end comprising a first processor and a second test end comprising a second processor, the first test end comprising:

type determination module, included in the first processor, configured to acquire at least one type of communication mode for the PLC security defense device, and identify at least one type of PLC corresponding to each type of communication mode;

the first test end further:
  sending by the first test end initialization information to the second test end, wherein the initialization information includes a communication mode, a PLC type and an initialization command;
  receiving by the second test end the initialization information;
  extracting correspondingly, from the initialization information, the communication mode and the PLC type;
attack type determination module, included in the first processor, configured to determine attack type and/or attack rule corresponding to each type of the PLC;
attack message generation module, included in the first processor, configured:
  to generate in the order of the type of communication mode and its corresponding PLC type, attack messages corresponding to each of the attack type and/or the attack rule, and send the attack messages to the PLC defense device under test in sequence of PLC security defense devices, which includes:
  acquiring communication message formats and host link commands corresponding to each type of PLC; and
  combining each of the attack type and/or the attack rule with the communication message formats and the host link commands corresponding to each type of PLC to generate attack messages for the device under test;
test result generation module, included in the first processor, configured:
  to derive the test result for the PLC security defense device according to all of the response messages acquired by the first test end, wherein the test result generation module further:
  counts a total number of attacks, number of interceptions and/or number of alerts, and obtains a ratio of the number of the interceptions and/or the number of the alerts to the total number of the attacks as the test result for the PLC security defense device under test;
the second test end including:
  response message generation module, included in the second processor, configured to:
  acquire attack messages generated by the PLC defense device under test;
  upon receiving the attack messages, generate response messages according to the acquired attack messages, and send the response messages to the first test end;
  wherein, both of the first test end and the second test end are composed of core board and expansion board base on said respective first processor and second processor; and wherein, the first test end and the second test end, the first test end and the PLC security defense device, and also the second test end and the PLC security defense device are connected by a communication link respectively.

4. The test system according to claim 3, wherein the system further includes:
  sending by the first test end an initialization information to the second test end when there are changes in the communication mode and/or the PLC type.

* * * * *